United States Patent
Maruyama

(12) 
(10) Patent No.: US 6,505,231 B1
(45) Date of Patent: Jan. 7, 2003

(54) SOFTWARE AGENT SYSTEM FOR ACQUIRING INFORMATION FROM SERVER ARRANGED ON NETWORK

(75) Inventor: Toshihiro Maruyama, Kanagawa-ken (JP)

(73) Assignee: Victor Company of Japan, Limited, Yokohama (JP)

(*) Notice: Subject to any disclaimer, the term of this patent is extended or adjusted under 35 U.S.C. 154(b) by 0 days.

(21) Appl. No.: 09/336,128

(22) Filed: Jun. 18, 1999

(30) Foreign Application Priority Data

Jul. 2, 1998 (JP) .......................... 10-187800

(51) Int. Cl.[7] ............................. G06F 15/16
(52) U.S. Cl. ................. 709/202; 709/217; 709/219; 709/229; 709/317; 707/10
(58) Field of Search ................ 709/200–203, 709/217–219, 223–224, 226, 229, 316–317; 707/9–10; 713/200–202; 717/100, 127–128

(56) References Cited

U.S. PATENT DOCUMENTS

| | | | | |
|---|---|---|---|---|
| 4,225,918 A | * | 9/1980 | Beadle et al. | 709/217 |
| 5,655,185 A | * | 8/1997 | Hori et al. | 399/138 |
| 5,657,480 A | * | 8/1997 | Jacobson | 717/100 |
| 5,678,041 A | * | 10/1997 | Baker et al. | 709/229 |
| 5,754,938 A | * | 5/1998 | Herz et al. | 709/219 |
| 5,893,096 A | * | 4/1999 | Nakamura | 709/229 |
| 6,330,586 B1 | * | 12/2001 | Yates et al. | 709/202 |
| 6,334,139 B1 | * | 12/2001 | Sakakura | 709/202 |
| 6,338,081 B1 | * | 1/2002 | Furusawa et al. | 709/202 |
| 6,393,386 B1 | * | 5/2002 | Zager et al. | 709/223 |

* cited by examiner

*Primary Examiner*—Bharat Barot
(74) *Attorney, Agent, or Firm*—Gary M. Nath; Harold L. Novick; Marvin C. Berkowitz

(57) ABSTRACT

A plurality of information sources are arranged on a network. An agent program is self-transferred to access the plurality of information sources for executing an information acquiring process. An information service 1 is connected with the network to store an access condition to the plurality of information sources. An agent program 3 is transferred to one of the plurality of information sources according to the access condition necessary for acquiring the information, when the agent program is inputted to the information service 1, and begins the information acquiring process to acquire the information.

2 Claims, 8 Drawing Sheets

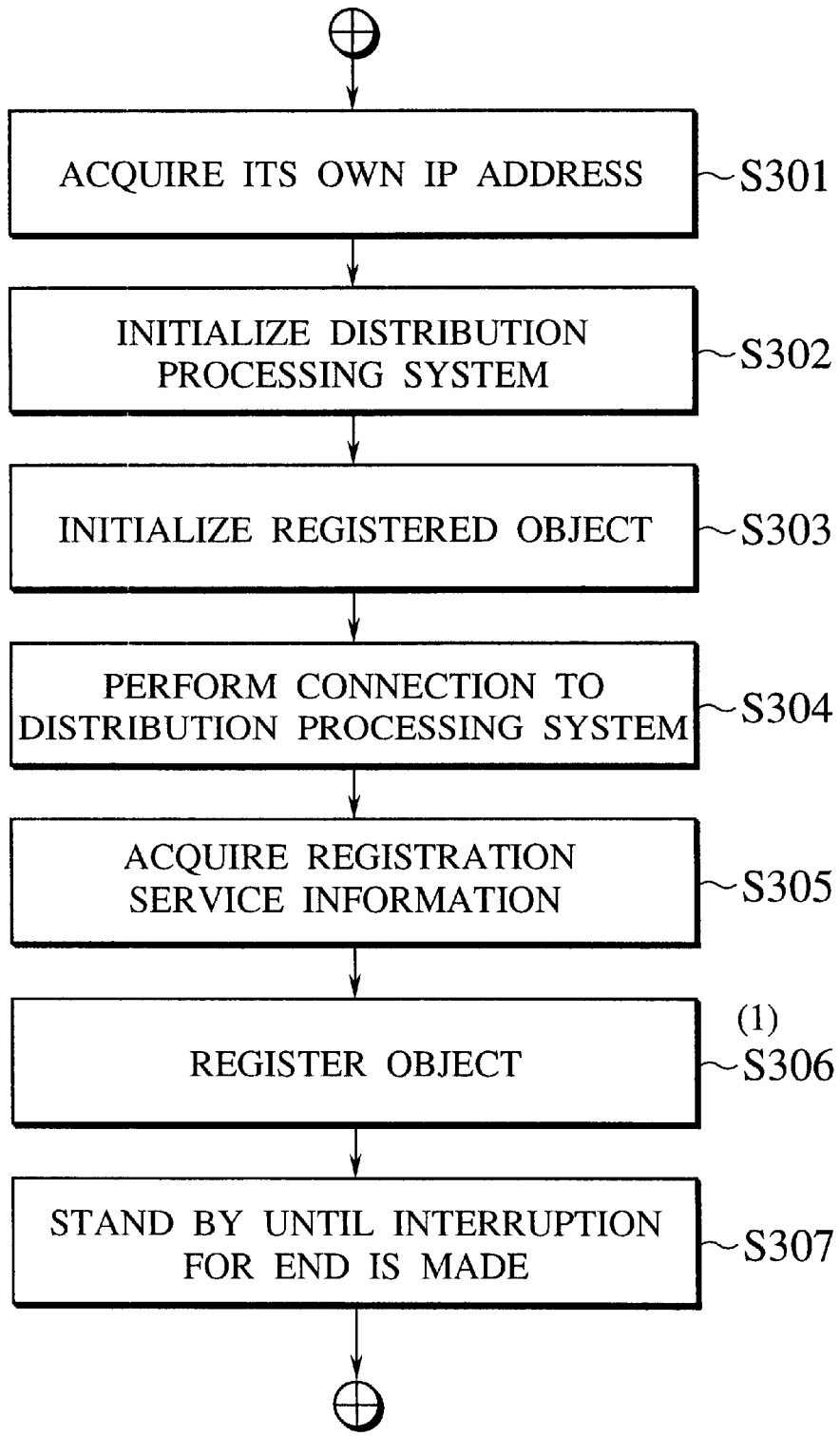

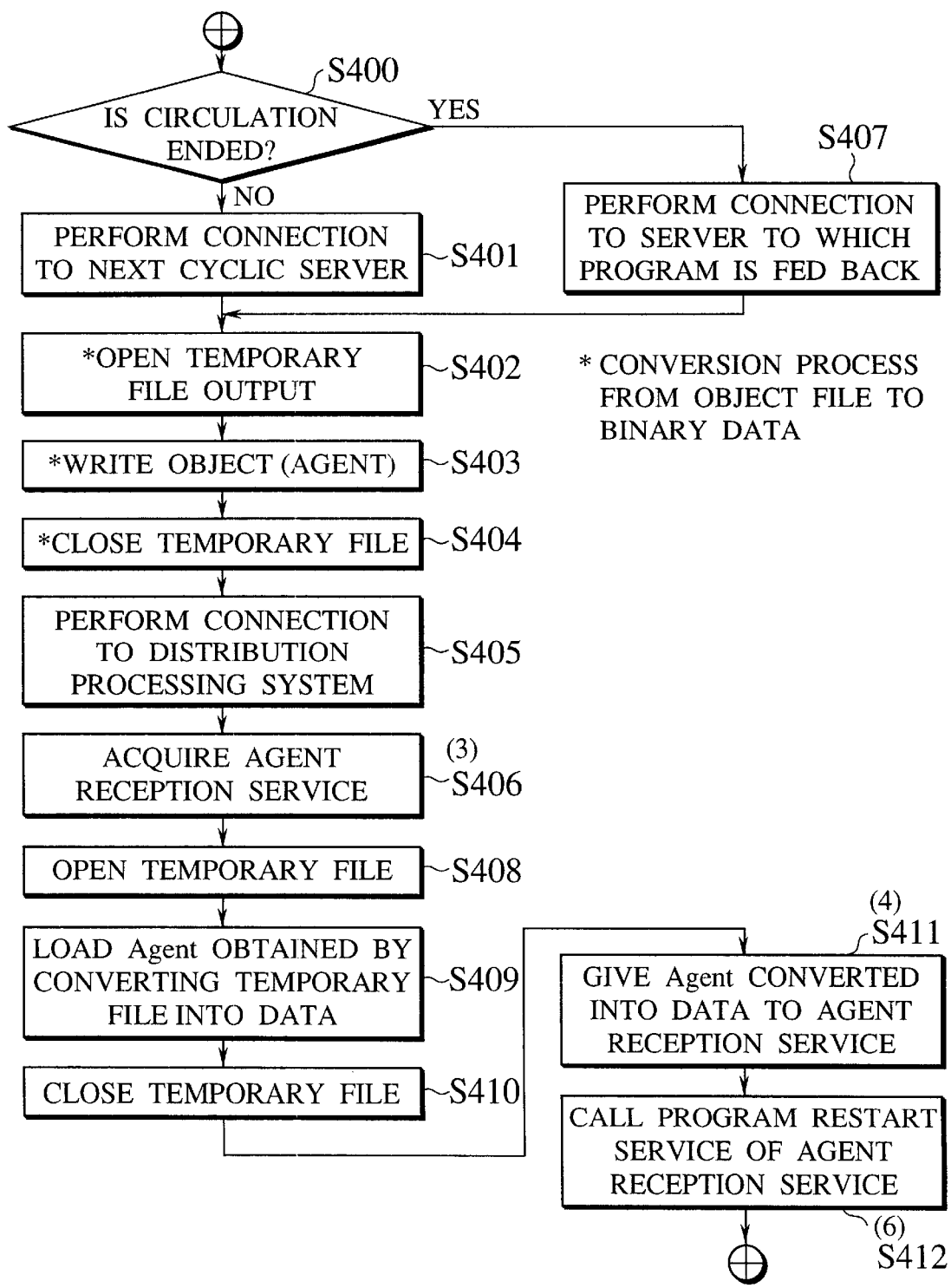

· OutTest.java

FIG.6A
- SimpleServerORBSernant.java
- SimpleServerServant CLASS
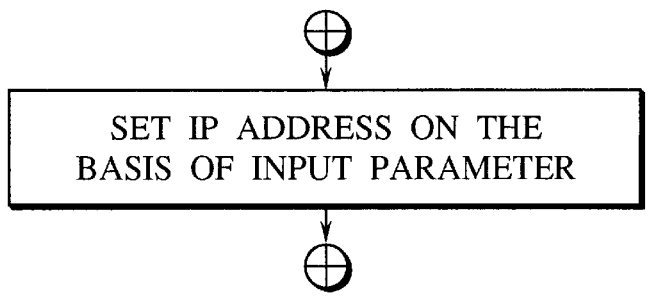
FIG.6B · GetAgent CLASS : (2)
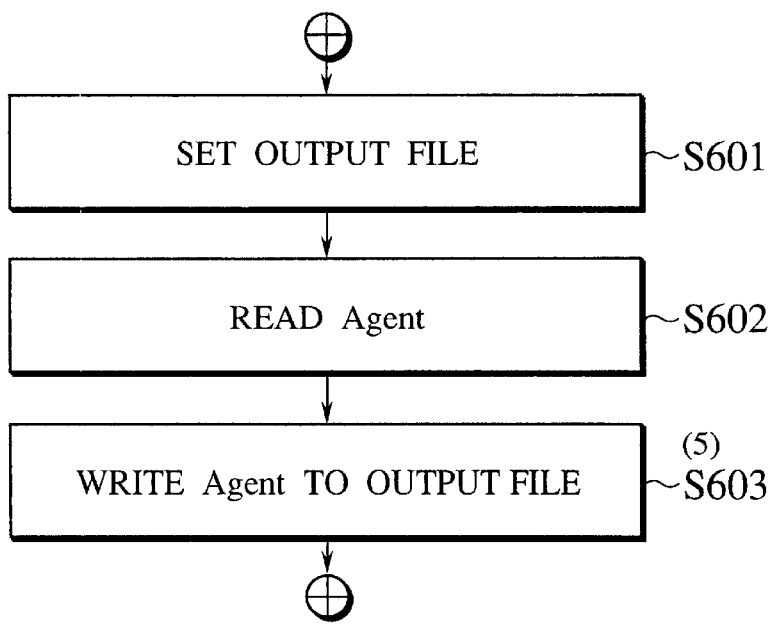
FIG.6C · StartAgent CLASS : (2)
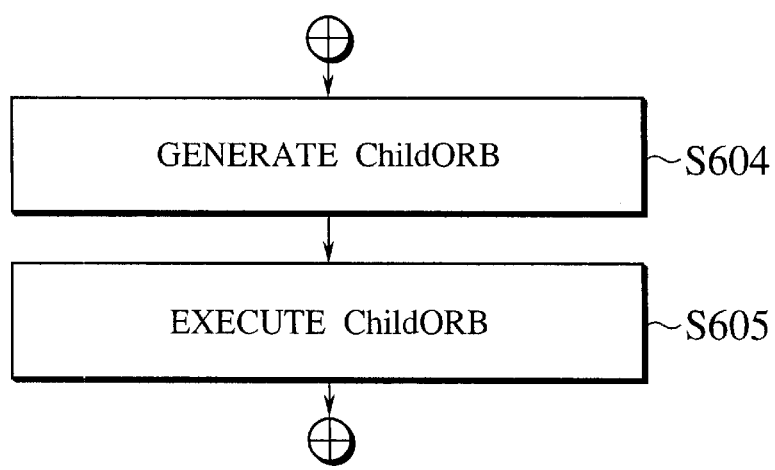

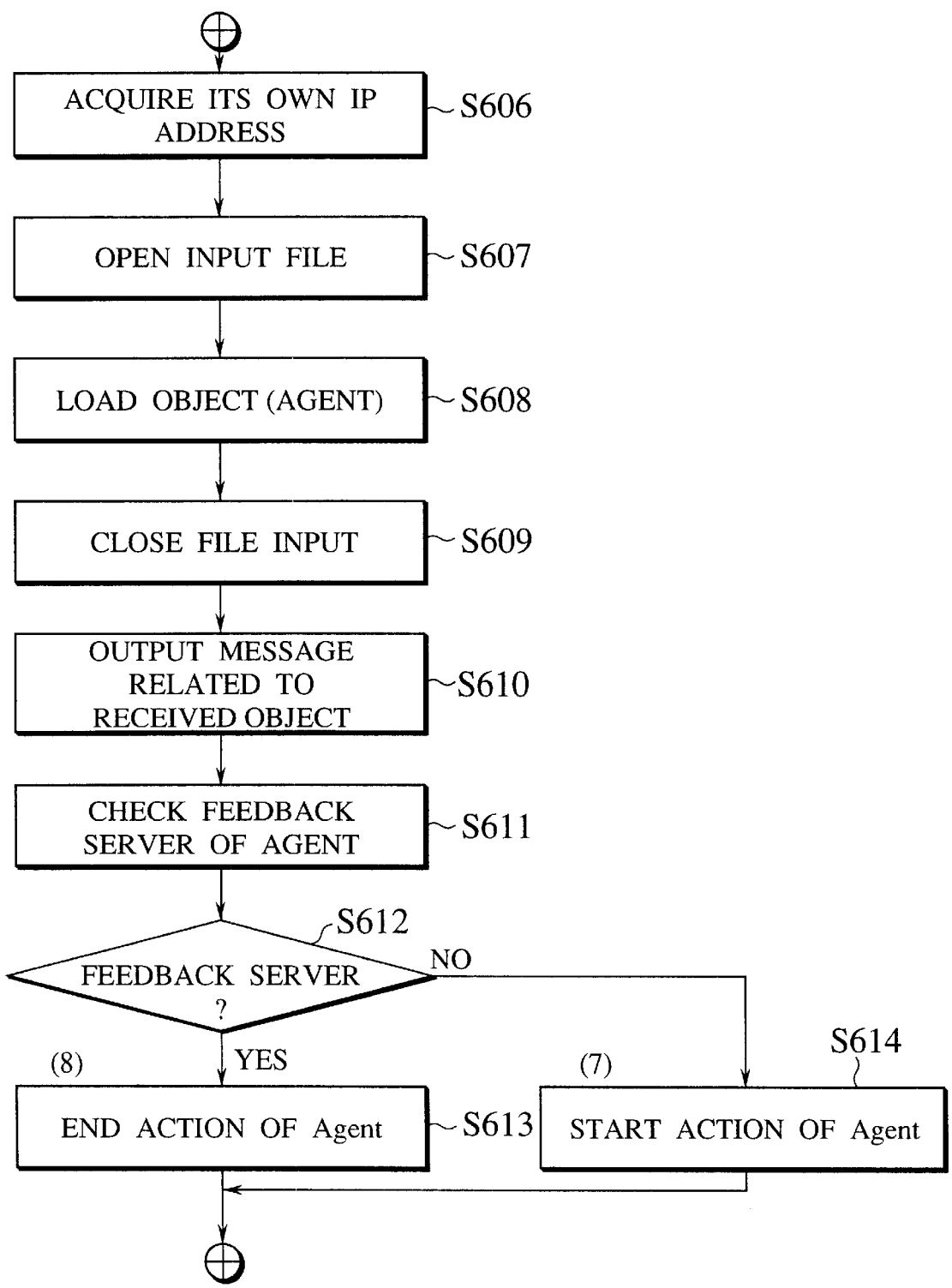

SOFTWARE AGENT SYSTEM FOR ACQUIRING INFORMATION FROM SERVER ARRANGED ON NETWORK

BACKGROUND OF THE INVENTION

1. Field of the Invention

The present invention relates to a software agent system using an agent program which, in accordance with access conditions held by a large number of servers distributed and arranged on a network, is self-transferred to access the servers and executes an information acquiring process.

2. Description of the Related Art

A software agent system is developed as a system using a network such as the Internet. In the software agent system, a software agent programmed on the basis of a request of a user in a client server is separated from the user and moves between a plurality of servers distributed and existing on a network by determination of the software agent, and the software agent acquires information desired by the user and then returns to the original client server.

According to the software agent system described above, a user may input only a request of the user in a client server. Searching on a network, access to a server on the network, and a processing operation for the server need not be directly performed, and desired information can be acquired.

FIGS. 1A to 1D explain the details of an agent program in the software agent system.

In the software agent system, the agent program has a function that an execution state of the program is written out of a server by a method called a serialize method. An agent server for receiving a serialized program and executing the programs again is also necessary. In FIGS. 1A to 1D shows a device in which a software agent moves from a client server to a specific server, performs an information acquiring process, and returns to the original client server.

As shown in FIG. 1A, a communication path to a specific server 81 on a network is secured on the basis of a program initialized and executed by the client server 80. Securing of the communication path can be easily performed by connecting using the protocol of, e.g., TCP/IP.

The program in execution in the client server 80 (machine 1) is transferred from the client server 80 to the other server 81 (machine 2) as a file through programs and work areas existing on the network 82 while the program is kept in an execution state by the method called a serialize method.

In this case, the serialize method makes it possible that a program on a memory is written as a file while a variable in the program and a work area are held.

The machine on the server 81 side monitors a specific port. When the port is accessed by an external server, the machine receives data, receives a program serialized on a memory or a file as a file (bit stream), and redefines the received file as a program. As the method of redefining a file as a program, a method of assigning a program/data structure which is generally defined in advance by a method called casting is used.

As shown in FIG. 1B, the agent which is redefined as a program causes the server 81 to call an entry for continuation serving as a program. The agent program called as the program restarts the interrupted program on the basis of the held variable and work area to continue a given process.

As shown in FIG. 1C, when a predetermined process is ended, the agent informs the original client server 80 of the results of the predetermined process, otherwise, the agent holds the process results and serializes itself again to transfer the program to the specific server 81.

Thereafter, as shown in FIG. 1D, the client server 80 receives the agent program. If the client server 80 has a process which can be executed, the client server 80 calls a process result output section such as a work area or the like in the received program, so that the result of the process performed by the server 81 can be acquired.

In this manner, as in the conventional art, a software agent system which transfers a program between different machines can be constituted.

However, in a conventional software agent system, when a program is to be sent, the server 81 on a reception side must be a known machine and must have a predetermined port number.

In addition, the server 81 must start a server program to be in a standby state. For this reason, a problem that an agent program cannot be sent to an unknown server is posed.

SUMMARY OF THE INVENTION

It is an object of the present invention to provide a software agent system which is self-transferred to access a server on a network and performs an information acquiring process, wherein it is made possible to access an information source on the network even if a user of the network does not set access conditions of the server in advance, so that use of the network can be made easier.

To achieve the object described above, there is provided a software agent system using an agent program which, in accordance with access conditions such as the addresses and implementation methods of a larger number of information sources distributed and arranged on a network, is self-transferred to access the information sources and executes an information acquiring process for these information sources, comprising:

an information service which is set on the network and on which the access conditions of the large number of information sources are stored, wherein the agent program acquires the access conditions from the information service and accesses the information sources on the basis of the acquired access conditions.

Preferably, the information service comprises reception means for receiving binary data output from the agent program and execution means for reading the received binary data as a program and for executing an information acquiring process for the information sources by the program.

Preferably, the agent program has serialize processing means for writing a program whose execution is started as binary data while the program is kept in an execution state, writes the program which is in the execution state as binary data to the reception means of the information service, and accesses the information sources through the execution means.

Preferably, after the agent program confirms that the agent program accesses the information sources through the execution means, the agent program supplies an execution instruction for the program written as binary data to the information sources through the information service.

According to the software agent system described above, by conforming, e.g., a CORBA service used as an information service, a user can send and restart a program by information obtained by inquiring at the name server or the like of the CORBA service even if the user does not know the access conditions of a predetermined server, a predetermined port, and the like.

BRIEF DESCRIPTION OF THE DRAWINGS

FIG. 3 is a flow chart of SimpleServerORB.java according to the first embodiment.

FIG. 4 is a flow chart of OuterAgentORB.java according to the first embodiment.

FIGS. 6A to 6C are flow chart of SimpleServerORBServant.java according to the first embodiment.

FIG. 7 is a flow chart of SimpleServerORBServant.java according to the first embodiment.

DETAILED DESCRIPTION OF THE PREFERRED EMBODIMENTS

First Embodiment

Figure 1A:
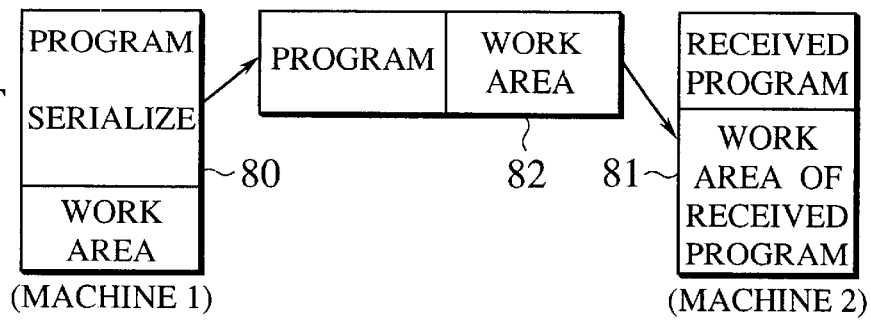
FIGS. 1A to 1D are diagrams illustrating the arrangements of a conventional software agent system.
Figure 1B:
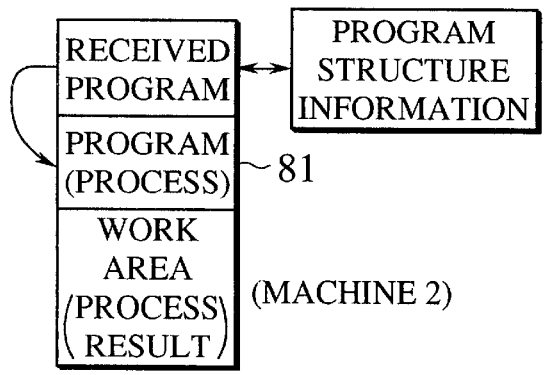
Figure 1C:
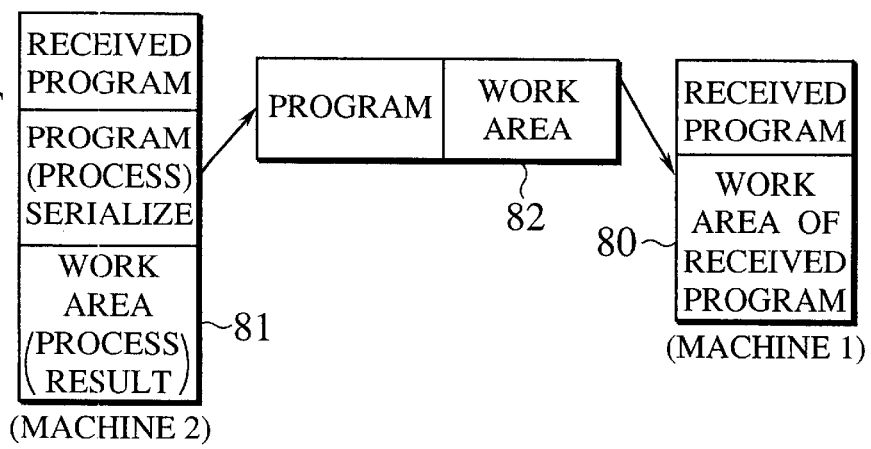
Figure 1D:
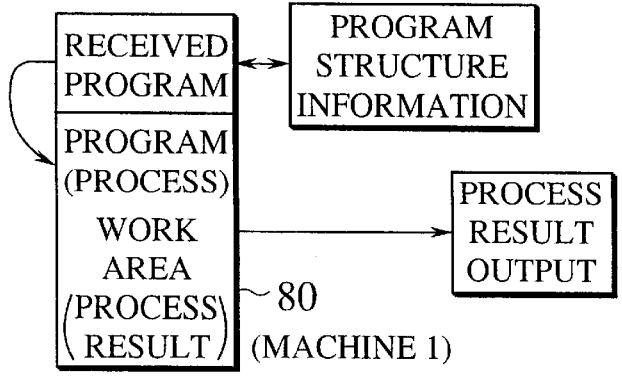

The first preferred embodiment of the present invention will be described below. FIGS. 2A to 2D illustrate the outline of a software agent system according to this embodiment.

Referring to FIGS. 2A to 2D, the agent system according to this embodiment is constituted by a server 2 which is one of a large number of information sources distributed and arranged on a network, an agent program 3 which is self-transferred on the network to access the server 2 or the like and executes an information acquiring process, and an information service 1 which is set on the network and on which access conditions of a large number of servers are stored.

In this case, the server 2 provides information for external access which satisfies access conditions such as a unique address and an implementation method (port number or the like). More specifically, the server 2 monitors a specific port. When the port is accessed by an external server, the server 2 receives data, a program such as a serialized agent program 3 is received as a bit stream on a memory or a file held by the server 2. The server 2 redefines the received bit stream as a program, executes the redefined program, and provides information.

On the other hand, the agent program 3 is serialized to convert itself into a bit stream and is written out of the server. The agent program 3 can be self-transferred to the server 2 or the information service 1.

Even if the agent program 3 is interrupted in the middle of execution, after a variable and a work area serving as process results are held, the agent program 3 can be self-transferred. The agent program 3 is redefined as a program at a transfer destination, and the agent program 3 can be continued from the portion where the execution of the program is interrupted on the basis of the held process results.

In this embodiment, the agent program 3 serializes itself by the same method as described in the conventional art. However, the embodiment is different from the conventional art in that serialized data is given to a remote server.

On the other hand, the information service 1 is a distributed object environment represented by, e.g. a CORBA service to store access conditions of respective servers on the network. The information service 1 according to the embodiment has GetAgent serving as a reception means for receiving binary data output from the agent program, and StartAgent serving as an execution means which reads the received binary data as a program and then executes an information acquiring process for the information source by the program.

In this case, the CORBA service defines a device for forming a client application held by a terminal directly used as a user and a server application held by a server on the basis of an IDL which is a language for defining an object such as a server, and a device for operating the formed application.

The CORBA service includes an implementation repository as a basic component. The implementation repository manages access conditions such as a position (address) at which a server is located and an implementation method (repository ID, starting path, type of server, user ID/group ID).

In this manner, even if a client application itself (including agent program) which accesses the CORBA service does not know the access conditions such as the address and implementation method of a server, the client application can access the server, so that a program (application) held by the server can be started through the CORBA service. Therefore, when the CORBA service is used, the start of a server program, which is required in the conventional art, through a specific port obtained by an agent program is not necessary.

A procedure used when the agent program 3 acquires information from the server 2 through the CORBA service serving as the information service 1 will be described below. In the first embodiment, after the agent program 3 confirms that the agent program 3 accesses the server through an execution means (GetAgent) of the information service 1, the agent program 3 supplies an execution instruction (StartAgent) of a program written as binary data to the server through the information service 1.

Figure 2A:
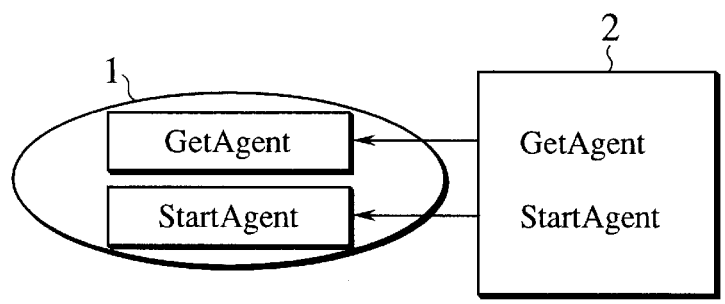
FIGS. 2A to 2D are diagrams illustrating the arrangements of a software agent system according to the first embodiment of the present invention.

As shown in FIG. 2A, each server on the network registers a service which is provided by the corresponding server in the information service 1 in the forms of GetAgent and StartAgent.

Figure 2B:
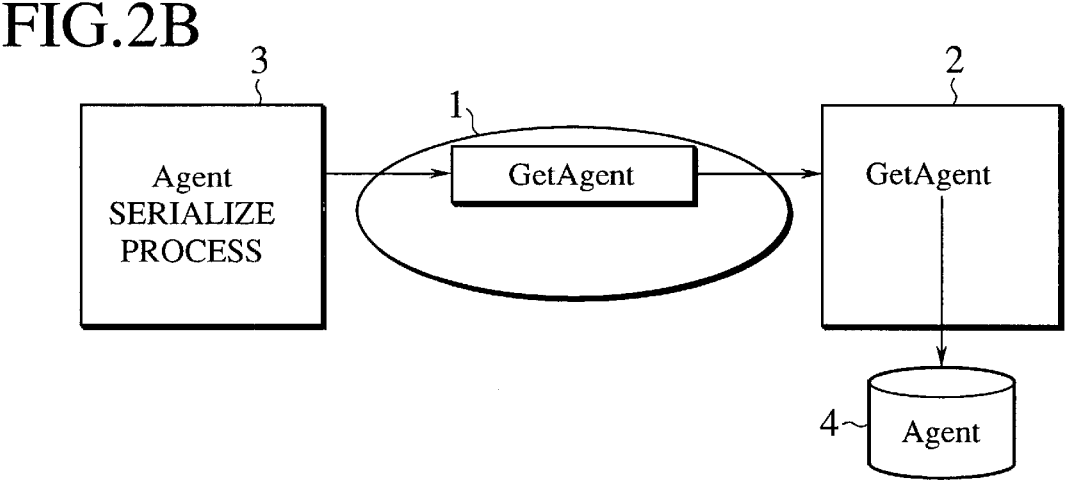

As shown in FIG. 2B, the agent program 3 accesses the information service 1 in a state wherein the agent program 3 holds conditions required to acquire information desired by a user.

At this time, the agent program 3 accesses the information service 1 in a state wherein the agent program 3 performs a serialize process to itself, and the agent program 3 calls GetAgent registered in the information service 1 to write itself in the file of the information service 1. In addition to this process, the information service 1 performs connection to the server 2 by using GetAgent, and forms a copy 4 of the agent program 3 in the server 2.

Figure 2C:
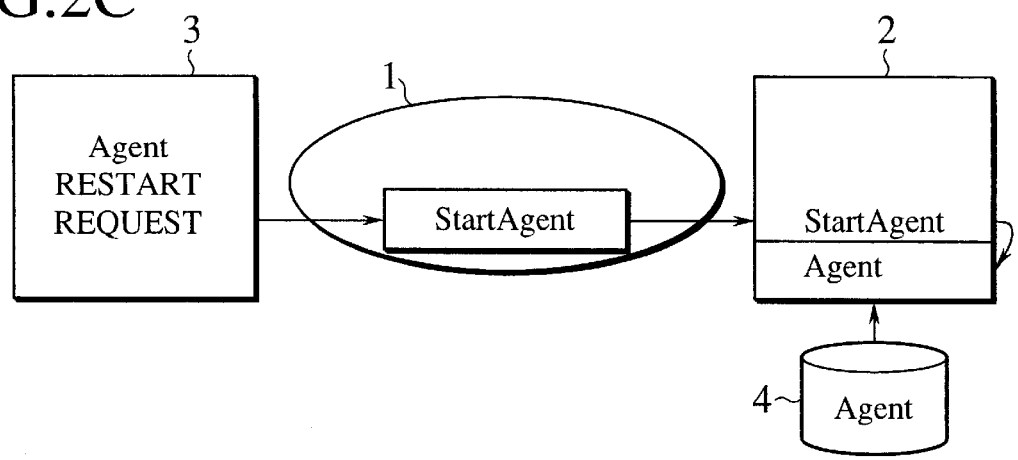

Furthermore, as shown in FIG. 2C, the agent program 3 uses StartAgent registered in the information service 1 to instruct the program in the server 2 to be started through the information service 1, starts an information acquiring process to acquire an execution result of the program. At this time, the agent program 3 on the information service 1 side may erase itself to complete self-transferring to the server 2.

Figure 2D:
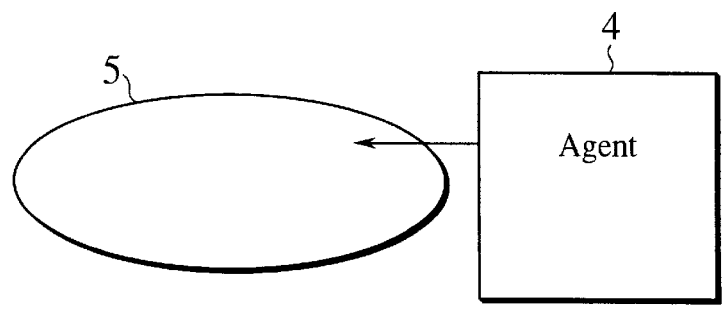

Thereafter, as shown in FIG. 2D, the agent program 3 which has acquired the information and has been self-transferred moves to another server by using, e.g., another information service 5 in accordance with the same procedure as described above.

Setting of a program for performing an information acquiring process executed by the agent program having the procedure described above will be described below.

An IDL file required to define a service provided to a distributed object environment (information service) represented by a CORBA service or the like is formed. This example is expressed by Equation 1.

The above-mentioned IDL is used to define an interface of an information service such as a CORBA service subject to communication between a server application and a client application (software agent program).

//OuterAgent.IDL
//1998.2.14T.MaruyamaJVC
module vp {
typedefsequence<octet>getagentarray;
// OuterAgent interface definition
interface OuterAgentReceive { oneway void getAgent(in
  getagentarray agent, in long c);
  oneway void startAgent( );
};
};

In this case, as described above, a service called getAgent which receives a serialized program and a service called startAgent which restarts the received program are defined. This getAgent defines only a call which is free from an input variable.

A program for performing an actual information acquiring process is formed on the basis of the IDL file. In this case, Java developed by Sun Microsystems Inc. is used. In order to implement a CORBA service by Java language, a module called JavaIDL is used. JavaIDL makes it possible to perform communication with the CORBA service (information service) by using IDL of a Java program.

First, SimpleServerORB.Java is formed. This SimpleServerORB.Java is an agent reception service registration program. The flow chart of this program is shown in FIG. 3.

In FIG. 3, in this SimpleServerORB.Java, the IP address of the agent reception service itself is acquired (S301). A distribution processing system is initialized (S302), and a registration object is initialized (S303). Next, connection to the distribution processing system is made (S304), registration service information is acquired (S305), and the object is registered (S306). By the registration of the object, a service for receiving an agent is performed. The program stands by until interruption for an end is made (S307).

OuterAgentORB.Java Is formed. This OuterAgentORB.Java is an agent program itself to be transferred. The flow chart of this program is shown in FIG. 4.

In FIG. 4, the OuterAgentORB. Java is of a StartORB class, and is a program used from when circulation (access) to a server and an information service is performed to when an information acquiring process in the information service is started. The process performed by the OuterAgentORB.Java will be described below.

The program checks whether moving, i.e., circulation, on the network is continued or ended (S400). When the circulation is ended, the program performs connection to a server to which the program is fed back (S407). When the circulation is continued, the program performs connection to the next cyclic server (S401).

After the program performs connection to the next cyclic server, a temporary file output is opened to perform a conversion process from an object file to a binary data file (S402), and the object (agent) is written (S403). Upon completion of the writing operation, the temporary file is closed (S404).

The program performs connection to a distribution processing system (S405) to acquire an agent reception service (S406). Thereafter, the program opens the temporary file (S408), loads an agent obtained by converting the temporary file into data (S409), and closes the temporary file (S410). The program gives the agent converted into data to the agent reception service (S411), and calls a program restart service of the agent reception service (S412).

Figure 5:
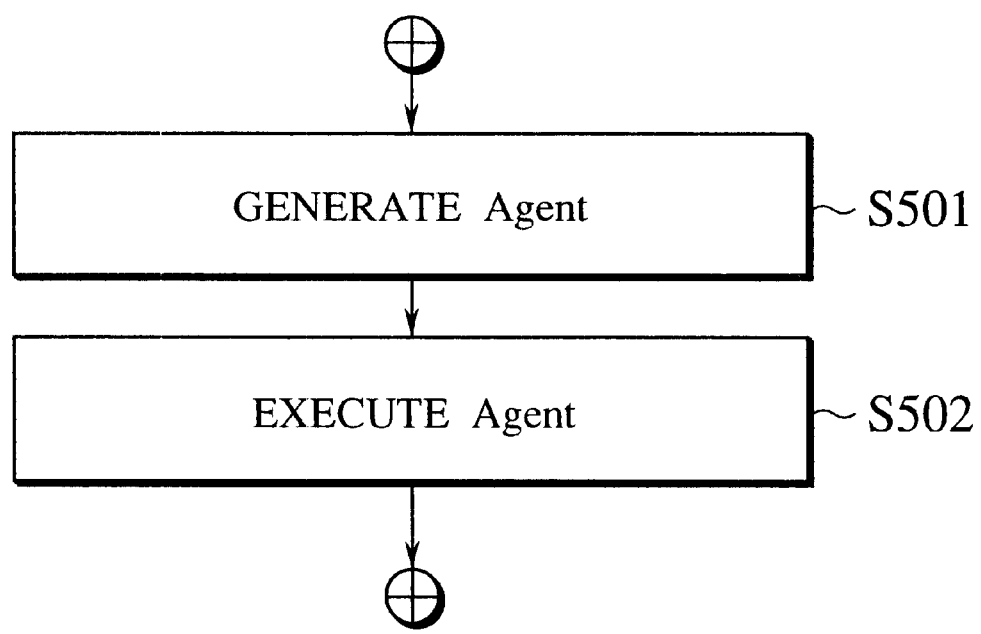
FIG. 5 is a flow chart of OutTest.java according to the first embodiment.

OutTestORB.Java is formed. This OutTestORB.Java is a program which starts an agent program at first. The flow chart of the OutTestORB.Java is shown in FIG. 5. In FIG. 5, in the OutTest ORB.Java, an agent is generated (S501), and the agent is executed (S502).

In addition, SimpleServerORBServant.Java is formed. This SimpleServerORBServant.Java is a program for an agent reception service. The flow chart of the SimpleServerORBServant. Java is shown in FIGS. 6A to 6C and FIG. 7. The SimpleServerORBServant. Java has a SimpleServerServant class (FIG. 6A), a GetAgent class (FIG. 6B), a StartAgent class (FIG. 6C), and a ChildORB class (FIG. 7).

In the SimpleServerServant class, as shown in FIG. 6A, the program sets an IP address on the basis of an input parameter.

In the GetAgent class, as shown in FIG. 6B, the program sets an output file (S601), reads Agent (S602), and then writes Agent to an output file (S603).

In the StartAgent class, as shown in FIG. 6C, the program generates ChildORB (S604) and executes ChildORB (S605).

In the ChildORB class, as shown in FIG. 7, the program acquires its own IP address (S606), opens an file input (S607), loads an object (agent) (S608), and closes the file input (S609). The program outputs a message W related to the received object (S610) and checks a feedback server of the agent (S611).

The program checks whether the server is a feedback server or not (S612). If the server is a feedback server, action of agent is ended (S613). If the server is not a feedback server, action of agent is started (S614).

Acquisition of information by the program formed as described above is performed by the following procedures. The numbers of procedures (1) to (6) are added to the steps of the programs shown in FIG. 3 to FIG. 7.

(1) Registration of a server (object) for receiving an agent is performed by SimpleServerORB.Java (S306 in FIG. 3). In this embodiment, the server is registered to have the name of "SimpleServerORB".

(2) An actual service is defined in a GetAgent class or a StartAgent class of SimpleServerORBServant.Java (FIG. 6B or 6C).

(3) When the program (agent) is to be sent, a user lets the program search for a specific service from name services (information services) of the destination. In this case, the service having the name of "SimpleServerORB" is searched for (S406 in FIG. 4).

In this embodiment, unlike the conventional art, a server which is actually received and a port number are not required. At this time. at least only one name server operating in a domain to be accessed may be known.

(4) When an agent reception service is acquired, the program serializes itself to temporarily write the serialized program in a file. The program loads the serialized program on a memory again, measures the size of the program, and writes the program in the server by using the acquired service information (S411 in FIG. 4).

(5) The program is written on a disk or a memory on the server side (S603 in FIG. 6B). At this time, a machine cannot be specified by the original program which is written.

(6) Upon completion of the writing of the program, the program calls startAgent (restart request of the program) serving as another service (S412 in FIG. 4). At this time, a program restart process reloads, as a program, the program data which has been written in the file or on the memory. In Java, a method called ReadObject is clearly used.

(7) The loaded Object data is cast as a program on the basis of program information called (OuterAgentORB) to call StartORB serving as a restart method (S614 in FIG. 7).

(8) When there is no process to which the called program nextly moves, the process is ended here, and a result is extracted to end the program restart process (S613 in FIG. 7).

Since this program restart process is described as a thread such that the program start process is started as another process, the original program which calls the restart process does not execute the program itself. For this reason, the process may be interrupted. Therefore, the restart process can be completely disconnected from the original program, and can be separated as an independent program.

Second Embodiment

The second embodiment of the present invention will be described below. This embodiment exemplifies case wherein after the getAgent process described above, a startAgent process is automatically called.

More specifically, in the first embodiment described above, after the agent program confirms that the agent program accesses a server through the execution means (GetAgent) of the information service 1, the agent program supplies an instruction (StartAgent) to execute a program written as binary data to the server through the CORBA service. However, in this embodiment, writing of the binary data is started without making the execution instruction.

FIGS. 8A to 8D illustrate a software agent system according to this embodiment.

Figure 8A:
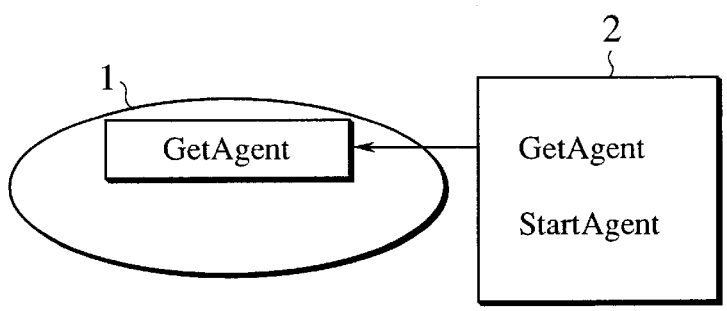
FIGS. 8A to 8D are diagrams illustrating the arrangements of a software agent system according to the second embodiment of the present invention.

As shown in FIG. 8A, each server on a network registers a server which is provided by the corresponding server in an information service 1 (serving as an information service) in the forms of GetAgent and StartAgent.

Figure 8B:
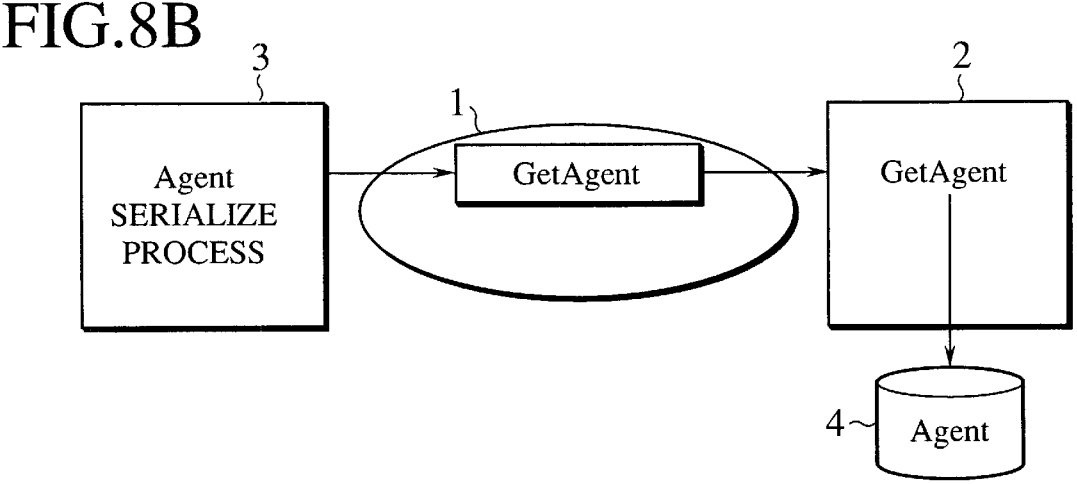

As shown in FIG. 8B, an agent program 3 accesses the information service 1 in a state wherein the agent program 3 holds conditions required to acquire information desired by a user. At this time, the agent program accesses the information service 1 in a state wherein the agent program performs a serialize process to itself, and the agent program calls GetAgent registered in the information service 1 to write itself in the file of the information service 1. In addition to this process, the information service 1 performs connection to a server 2 by using GetAgent, and forms a copy 4 of the agent program 3 in the server 2.

Figure 8C:
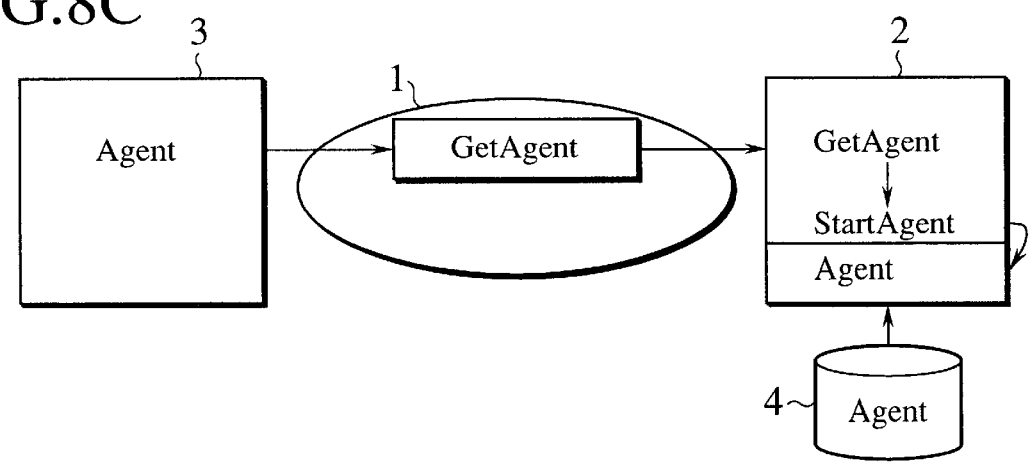

Furthermore, as shown in FIG. 8C, when the copying is ended, the server 2 automatically starts a program in the server 2 through StartAgent held by the server 2. An execution result of the program is acquired. At this time, the agent program 3 on the information service 1 side erases itself to complete self-transferring to the server 2.

Figure 8D:
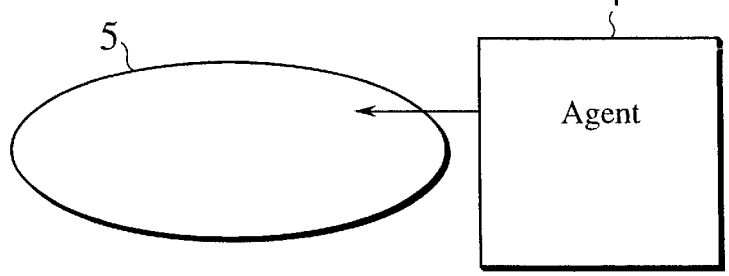

Thereafter, as shown in FIG. 8D, the agent program 3 obtained after the information acquisition and self-transferring are performed moves to another server by using, e.g., another information service 5, according to the same procedures described above.

According to this embodiment in which execution of the program in the server 2 is automatically started without using an execution instruction (StartAgent) of the information. service 1, the process of supplying the execution instruction to the server 2 can be omitted, and an information acquiring process can be started immediately after access.

What is claimed is:

1. A software agent system for acquiring information from information sources arranged on a network, comprising:

a plurality of information sources arranged on a network;

an agent program which is self-transferred to access the plurality of information sources for executing an information acquiring process;

an information service connected with the network, for storing an access condition to the plurality of information sources;

wherein the agent program is transferred to one of the plurality of information sources according to the access condition necessary for acquiring the information, when the agent program is inputted to the information service, and begins the information acquiring process to acquire the information.

2. The software agent system according to claim 1, the agent program is serialized that the program is transferred as a file while a variable in the program and a work area is retained.

* * * * *